United States Patent
Ludewig et al.

(10) Patent No.: US 9,541,758 B2
(45) Date of Patent: Jan. 10, 2017

(54) DISPLAY, IN PARTICULAR HEAD-UP-DISPLAY OF A VEHICLE

(76) Inventors: Bernd Ludewig, Weinheim (DE); Sebastien Hervy, La Garenne Colombes (FR)

(*) Notice: Subject to any disclaimer, the term of this patent is extended or adjusted under 35 U.S.C. 154(b) by 661 days.

(21) Appl. No.: 13/700,097

(22) PCT Filed: Mar. 28, 2011

(86) PCT No.: PCT/EP2011/001537
§ 371 (c)(1),
(2), (4) Date: Apr. 4, 2013

(87) PCT Pub. No.: WO2011/147501
PCT Pub. Date: Dec. 1, 2011

(65) Prior Publication Data
US 2013/0182197 A1    Jul. 18, 2013

(30) Foreign Application Priority Data

May 26, 2010  (DE) ................ 10 2010 021 496
Oct. 15, 2010  (DE) ................ 100 13 682

(51) Int. Cl.
| | | |
|---|---|---|
| *G02F 1/1335* | (2006.01) | |
| *G02B 27/01* | (2006.01) | |
| *G02F 1/13* | (2006.01) | |
| *G02B 5/30* | (2006.01) | |

(Continued)

(52) U.S. Cl.
CPC ......... *G02B 27/0101* (2013.01); *G02F 1/1313* (2013.01); *G02B 5/30* (2013.01); *G02B 27/283* (2013.01); *G02B 2027/011* (2013.01); *G02B 2027/0112* (2013.01);

(Continued)

(58) Field of Classification Search
CPC ............... H04N 9/3197; H04N 9/3105; G02F 2001/13355
See application file for complete search history.

(56) References Cited

U.S. PATENT DOCUMENTS

| | | | |
|---|---|---|---|
| 2002/0008708 A1 | 1/2002 | Weiss et al. | |
| 2005/0140573 A1 | 6/2005 | Riser et al. | |

(Continued)

FOREIGN PATENT DOCUMENTS

| | | | |
|---|---|---|---|
| EP | 1158336 A2 | 11/2001 | |
| EP | 1538477 A1 | 6/2005 | |

(Continued)

OTHER PUBLICATIONS

Japanese Office Action for Application No. 2013-511557 mailed Sep. 2, 2014.

(Continued)

*Primary Examiner* — Phu Vu
(74) *Attorney, Agent, or Firm* — Fletcher Yoder, P.C.

(57) ABSTRACT

The present invention relates to a display, in particular Head-Up-Display of a vehicle, comprising an image forming unit for generating an image, an illumination means for illuminating the image forming unit and a deflecting unit for providing a user with a virtual image of the image generated by the image forming unit, wherein the image forming unit comprises a reflective LCoS—(Liquid Crystal on Silicon) display and the deflecting unit comprises a partially transmissive combiner.

13 Claims, 1 Drawing Sheet

(51) Int. Cl.
*G02B 27/28* (2006.01)
*G02F 1/1362* (2006.01)

(52) U.S. Cl.
CPC .. *G02F 1/133553* (2013.01); *G02F 1/136277* (2013.01); *G02F 2001/13355* (2013.01)

(56) References Cited

U.S. PATENT DOCUMENTS

2005/0270432 A1* 12/2005 Overline ............... G02F 1/1333
 349/16
2009/0213037 A1* 8/2009 Schon .............................. 345/7

FOREIGN PATENT DOCUMENTS

| EP | 2093603 A1 | 8/2009 |
|---|---|---|
| JP | 08292393 A | 11/1996 |
| JP | H10-62711 A | 3/1998 |
| JP | 10222093 A | 8/1998 |
| JP | H11-119147 A | 4/1999 |
| JP | 2000/352687 A | 12/2000 |
| JP | 2001356294 A | 12/2001 |
| JP | 2002-104017 A | 4/2002 |
| JP | 2002234360 A | 8/2002 |
| JP | 2003523529 A | 8/2003 |
| JP | 2007182189 A | 7/2007 |
| JP | 2008216852 A | 9/2008 |
| JP | 2009229552 A | 10/2009 |
| JP | 2010256867 A | 11/2010 |
| JP | 2011158543 A | 8/2011 |
| JP | 2013516649 A | 5/2013 |
| WO | 2010064582 A1 | 6/2010 |

OTHER PUBLICATIONS

Chinese Office Action mailed Feb. 17, 2015.
Japanese Examination Report dated May 21, 2014.
International Search Report & Written Opinion for application No. PCT/EP2011/001537 mailed Jun. 9, 2011.
Liquid crystal on silicon, https://en.wikipedia.org/wiki/Liquid_crystal_on_silicon, Jun. 9, 2016.

* cited by examiner

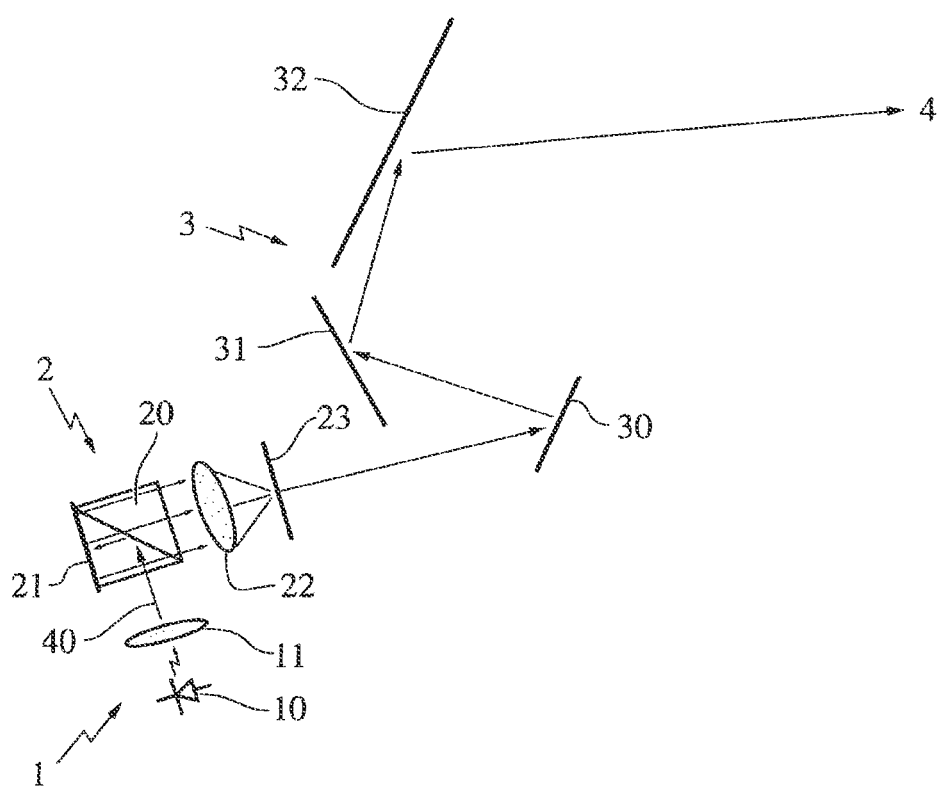

DISPLAY, IN PARTICULAR HEAD-UP-DISPLAY OF A VEHICLE

CROSS REFERENCE TO RELATED APPLICATIONS

This application claims priority from and the benefit of PCT Application No. PCT/EP2011/001537, filed on Mar. 28, 2011; German Patent No. DE 10 2010 021 496.5, filed on May 26, 2010; and German Patent EP 10013682.9, filed on Oct. 15, 2010, which are herein incorporated by reference.

BACKGROUND

The present invention relates to a display, in particular Head-Up-Display of a vehicle, comprising an image forming unit for generating an image, an illumination means for illuminating the image forming unit and a deflecting unit for providing a user with a virtual image of the image generated by the image forming unit.

Suchlike Head-Up-Displays are commonly known from the prior art. They have been used in airplane cockpits and motor vehicles for several years in order to provide the pilot or the driver with information like e.g. operational data of the airplane or the vehicle in a comfortable manner. For this purpose, Head-Up-Displays with monochrome visual imaging are used mostly. Meanwhile, the pilot or the driver has to be provided with a continually increasing amount of information, so that a most clear and detailed visualization of the information is required. This can advantageously be achieved by a multi-colored visualization of the information. In this way, a warning message can be highlighted compared to less important information, for instance.

Commonly used multi-colored Head-Up-Displays usually work with LCD (Liquid Crystal Display)-displays, which are backlighted by an intensive light source, e.g. a LED (Light Emitting Diode). Disadvantageously, the brightness and the contrast of suchlike Head-Up Displays are comparatively low due to a comparatively low transmission of the LCD-display. Consequently, the visualization of the information is not favorable for the drivers or the pilots. Furthermore, the low transmission cannot be compensated simply by increasing the light intensity of the light source, because the intensive light source generates a lot of heat, so that a comparatively complex and expensive cooling mechanism for cooling down the display would be needed in this case.

SUMMARY

It is therefore an object of the present invention to provide a multi-colored display with a comparatively high contrast and a high brightness which is nevertheless compact and causes only low heating.

The object of the present invention is achieved by a display, in particular Head-Up-Display of a vehicle, comprising an image forming unit for generating an image, an illumination means for illuminating the image forming unit and a deflecting unit for providing a user with a virtual image of the image generated by the image forming unit, wherein the image forming unit comprises a reflective LCoS—(Liquid Crystal on Silicon) display and the deflecting unit comprises a partially transmissive combiner.

Compared to a LCD-display, the light losses in a LCoS-display are substantially smaller, so that a LCoS-display generates significantly fewer heat. According to the present invention, it is thereby advantageously possible to generate a high contrast and a particularly luminous virtual image. Simultaneously, a compact and cost-effective design of the display is feasible because there is no need for any coofing mechanisms as only low heat is generated.

According to a preferred embodiment of the present invention, the illumination means comprises a first light source, in particular a LED (Light Emitting Diode) or a Laser (Light Amplification by Stimulated Emission of Radiation) light source. Furthermore, the illumination means particularly preferably comprises at least one further light source, wherein the first light source is configured for emitting light of a first wavelength or of a first wavelength range and the at least one further light source is configured for emitting light of a further wavelength or of a further wavelength range. For this purpose e.g. colored LEDs, dye lasers, semiconductor lasers or infrared lasers with non-linear optical elements are used as light sources according to the present invention.

Preferably, the illumination means comprises a light collimating optical element for collimating light of the first light source and light of the at least one further light source to a single light beam. According to the present invention a suchlike collimating optical element is realized preferably by a dichroitic mirror. It is herewith advantageously possible to collimate light of different colors to a single light beam.

Preferably, the image forming unit comprises a polarizing beam splitter. Particularly preferred, the splitter is configured in such a manner that either light coming from the illumination means is reflected at least partially at the polarizing beam splitter and light reflected by the LCoS-display is substantially entirely transmitted or that light coming from the illumination means is at least partly transmitted and light reflected by the LCoS-display is substantially entirely reflected by the polarizing beam splitter. It is herewith advantageously possible to locate the polarizing beam splitter in the light path of the light reflected by the LCoS-display in order to provide a very compact display.

According to a preferred embodiment of the present invention, the illumination means comprises a control means, wherein the control means is configured for alternate enabling and disabling the first light source and/or the at least one further light source with a certain frequency. Particular preferably the control means is configured to modulate the light beam by means of the LCoS-display with the same frequency. It is herewith advantageously possible that the modulation of the light beam by means of the LCoS-display is performed synchronously to the frequency of the light source and/or of the at least one further light source. It is obvious for the person skilled in the art, that it is herewith advantageously possible that the observer perceives a multi-colored virtual image of the image content illustrated by the LCoS-display when the illumination means comprises a red light source, a green light source and a blue light source, for instance. Here, the image content illustrated by the LCoS-display can be divided into a red component, a green component and a blue component, wherein the modulation of the light beam is for the red component synchronized to the red light source, for the green component synchronized to the green light source and for the blue component synchronized to the blue light source. The frequency is preferably higher than 100 Hz, particularly preferably higher than 150 Hz and most particularly preferably higher than 200 Hz, so that the observer perceives a virtual image of the image content illustrated by the LCoS-display wherein the virtual image appears as a comparatively pleasant and accurate multi-color image.

According to a preferred embodiment of the present invention, the image forming unit comprises a light scattering surface, wherein the scattering surface is at least partially transmissive and wherein the scattering surface is provided in a light path of the light reflected by the LCoS-display and wherein the scattering surface is located between the LCoS-display and the combiner. The image content generated by the LCoS-display is displayed on the scattering surface by means of at least one optical element. This makes it advantageously possible to eliminate image artifacts in the virtual image and in particular to reduce disturbing optical interference effects arising from using lasers as light sources.

Preferably the deflecting unit comprises at least one deflecting mirror. According to the present invention the deflecting mirror is provided as a flat mirror, particularly preferably as concave or convex mirror and most particularly preferably as a free form mirror. It is herewith advantageously possible to adapt the light path to the spatial requirements in a cockpit or in a vehicle interior compartment and to design the display sufficiently flexible. Furthermore, the usage of free form mirrors allows the compensation of optical aberrations and therefore to provide a high quality illustration.

According to another preferred embodiment, the display comprises an adjusting device for adjusting the deflecting unit and in particular the position and/or the orientation of the deflecting unit. The adjusting device e.g. comprises mechanical and/or electromechanical adjusting elements in order to adapt the display to the requirements of the observer. Thereby it is possible tilting the combiner in order to set up an optimized visual angle for the observer or to shift the combiner entirely out of the visual range of the observer, for instance.

According to a preferred embodiment of the present invention, the display comprises a dimmer for diming the illumination means, wherein preferably the display comprises a light sensor for automatically diming the illumination means. It is herewith advantageously possible that the brightness of the virtual image is manually adjustable and/or that the brightness of the virtual image is adjusted automatically to external light conditions by means of the light sensor, e.g. during twilight. Thereby, high quality illustration of the display is also provided in difficult lighting conditions or during unfavorable lighting conditions, e.g. in the presence of strong and direct sunlight or the like.

According to another preferred embodiment of the present invention, the combiner is made of plastic, preferably PCB or PMMA, wherein particularly preferably the combiner comprises an optical coating. The optical coating e.g. comprises an anti-reflex coating and/or an optical bandpass coating. The optical bandpass coating allows the adaptation of the reflection and/or transmission properties of the combiner to the wavelength or the wavelength range of the light emitted by the light sources. Advantageously, the reflection of ambient light can be reduced.

These and other characteristics, features and advantages of the present invention will become apparent from the following detailed description, taken in conjunction with the accompanying drawing, which illustrate, by way of example, the principles of the invention. The description is given for the sake of example only, without limiting the scope of the invention. The reference FIGURES quoted below refer to the attached drawings.

DRAWINGS

FIG. 1 schematically illustrates a display according to an exemplary embodiment of the present invention.

DETAILED DESCRIPTION

In FIG. 1 a Head-Up-Display according to an exemplary embodiment of the present invention is illustrated. The Head-Up-Display comprises an illuminating means 1, an image forming unit 2 and a deflecting unit 3. The illuminating means 1 comprises at least one light source 10 and a light collimating optical element 11, wherein the light source 10 is provided as LED or as Laser according to the present invention. The light source 10 emits light having a first wavelength or having a wavelength of a first wavelength range. The light collimating optical element 11 collimates light emitted by the light source 10 substantially to a single light beam 40, so that the light from the light source 10 leaves the illuminating means 1 as a single light beam 40 with substantially parallel light paths. In the present example, the light collimating optical element 11 comprises a collecting lens.

A polarizing beam splitter 20 of the image forming unit 2 reflects the light beam 40 at least partially and redirects the light beam 40 towards a screen of a reflective LCoS-display 21 of the image forming unit 2. The part of the light beam reflected by the splitter 20 is linearly polarized along a first polarizing direction. According to the illustrated embodiment, the polarizing beam splitter 20 is located in such a manner that the incidence angle between the light beam 40 coming from the illuminating means 1 and the normal vector of the main plane of the polarizing beam splitter 20 is substantially 45°. According to the present invention, it is conceivable that the light beam 40 exiting the illuminating means 1 is already polarized in such a manner that the light beam 40 is entirely reflected at the polarizing beam splitter 20.

The light beam redirected towards the LCoS-display 21 hits substantially perpendicular onto the screen. The LCoS-display 21 modulates the light beam with image information. The suchlike modulated light beam is reflected by the reflective LCoS-display 21 towards a deflecting unit 3. Hereby, the modulated light beam is polarized in a second polarizing direction which is substantially perpendicular to the first polarizing direction. The modulated light beam is substantially transmitted entirely through the polarizing beam splitter 20 and is displayed in an intermediate image plane 23 by means of the optical element 22, which comprises e.g. a further collecting lens. The intermediate image plane 23 is provided as scattering surface, for instance.

The light beam coming from the intermediate image plane 23 is redirected towards an observer, e.g. a pilot or driver sitting in the vehicle's interior compartment (not shown in FIG. 1), by means of the deflecting unit 3 in such a manner that the image content illustrated on the LCoS-display 21 appears to the observer as a virtual image. According to the illustrated embodiment of the present invention, the deflecting unit 3 comprises a first deflecting mirror 30, a second deflecting mirror 31 and a combiner 32. The usage of multiple different deflecting mirrors makes it possible that the light beam is directed towards the observer, wherein the light beam path is adapted to the spatial requirements e.g. the spatial requirements of the vehicle interior compartment. In this manner, the distance between the virtual image and the observer can be adjusted and optimized, for instance. Preferably, the first and second deflecting mirrors 30, 31 are formed as customized free form mirrors in order to compensate optical aberrations. The combiner 32 preferably comprises an optical coating in order to advantageously adapt the reflection and transmission properties of the combiner 32 to the wavelength range of the light emitted by the light sources 10. Preferably, the combiner 32 can be tilted mechanically or electromechanically by an adjusting device (not shown in FIG. 1), so that the combiner 32 can be shifted entirely out of the visual range of the observer, if the display is not in use.

The invention claimed is:

1. A display for a vehicle, comprising an image forming unit configured to generate an image, an illumination device that in operation illuminates the image forming unit, a deflecting unit that in operation provides a user with a virtual image of the image generated by the image forming unit, and a dimmer configured to dim the illumination device;
   wherein the image forming unit comprises a reflective liquid crystal on silicon (LCoS) display and an at least partially transmissive scattering surface provided along a light path of light reflected from the reflective LCoS display between the reflective LCoS display and the deflecting unit, and the deflecting unit comprises a partially transmissive combiner;
   wherein the reflective LCoS display comprises a light sensor configured to automatically control the dimmer;
   wherein the image forming unit comprises a polarizing beam splitter, the polarizing beam splitter is oriented such that an incidence angle between a light beam coming from the illuminating device and a normal vector of a main plane of the polarizing beam splitter is substantially 45 degrees, the polarizing beam splitter is configured to at least partially reflect the light beam coming from the illumination device toward the reflective LCoS display and to transmit the light reflected by the reflective LCoS display toward the deflecting unit; and
   wherein, in operation, a part of the light beam reflected by the polarizing beam splitter is linearly polarized along a first polarizing direction, the part of the light beam reflected by the polarizing beam splitter hits substantially perpendicular onto a screen of the reflective LCoS display, the reflective LCoS display modulates the light beam with image information to create a modulated light beam, the modulated light beam is polarized in a second polarizing direction which is substantially perpendicular to the first polarizing direction, the modulated light beam is reflected by the reflective LCoS display toward the deflecting unit, and the modulated light beam is substantially transmitted entirely through the polarizing beam splitter.

2. The display according to claim 1, wherein the illumination device comprises a first light source.

3. The display according to claim 1, wherein the illumination device comprises a first light source and at least one further light source, wherein the first light source is configured to emit light of a first wavelength or of a first wavelength range and wherein the at least one further light source is configured to emit light of a further wavelength or of a further wavelength range.

4. The display according to claim 3, wherein the illumination device comprises a light collimating optical element configured to collimate light of the first light source and light of the at least one further light source to a single light beam.

5. The display according to claim 4, wherein the collimating optical element comprises a dichroitic mirror.

6. The display according to claim 3, wherein the illumination device comprises a controller configured to enable and disable the first light source and/or the at least one further light source.

7. The display according to claim 1, wherein the deflecting unit comprises at least one deflecting mirror which comprises a flat mirror, a concave mirror, a convex mirror, a customized free form mirror, or a combination thereof.

8. The display according to claim 1, comprising an adjusting device configured to adjust the position and/or the orientation of the deflecting unit.

9. The display according to claim 1, wherein the combiner is made of plastic, and/or wherein the combiner comprises an anti-reflex coating and/or an optical bandpass coating.

10. The display according to claim 2, wherein the first light source comprises a light emitting diode.

11. The display according to claim 2, wherein the first light source comprises a laser light source.

12. The display according to claim 6, wherein the first and the at least one further light source are enabled alternating with a certain frequency.

13. The display according to claim 12, wherein the controller is configured to modulate the part of the light beam via the reflective LCoS display with substantially the same frequency.

* * * * *